United States Patent
Jakobsson (10) Patent No.: US 10,013,545 B2
(45) Date of Patent: Jul. 3, 2018

(54) SYSTEMS AND METHODS FOR CREATING A USER CREDENTIAL AND AUTHENTICATION USING THE CREATED USER CREDENTIAL

(75) Inventor: Bjorn Markus Jakobsson, Mountain View, CA (US)

(73) Assignee: PayPal, Inc., San Jose, CA (US)

(*) Notice: Subject to any disclaimer, the term of this patent is extended or adjusted under 35 U.S.C. 154(b) by 139 days.

(21) Appl. No.: 13/604,307

(22) Filed: Sep. 5, 2012

(65) Prior Publication Data
US 2013/0111571 A1    May 2, 2013

Related U.S. Application Data

(60) Provisional application No. 61/552,297, filed on Oct. 27, 2011.

(51) Int. Cl.
  *G06F 21/46*    (2013.01)
  *G06F 21/36*    (2013.01)

(52) U.S. Cl.
  CPC .................... *G06F 21/36* (2013.01)

(58) Field of Classification Search
  CPC .......... G06F 21/32; G06F 21/36; G06F 21/46; H04L 63/083; H04L 63/0861; H04L 63/12; G06Q 20/40145; G07F 7/10
  USPC ...... 726/6, 18, 19, 21, 28, 29; 713/183, 184, 713/186; 705/72, 76
  See application file for complete search history.

(56) References Cited

U.S. PATENT DOCUMENTS

| | | | |
|---|---|---|---|
| 6,618,806 B1 * | 9/2003 | Brown et al. ................. | 713/186 |
| 6,853,988 B1 * | 2/2005 | Dickinson et al. ............. | 705/75 |
| 7,114,080 B2 * | 9/2006 | Rahman et al. .............. | 713/186 |
| 7,367,053 B2 * | 4/2008 | Sanai et al. ....................... | 726/6 |
| 7,441,122 B2 * | 10/2008 | Plagne .......................... | 713/182 |
| 7,681,234 B2 * | 3/2010 | Florencio et al. .............. | 726/22 |
| 7,873,995 B2 * | 1/2011 | Bagga et al. ................... | 726/19 |
| 7,958,539 B2 * | 6/2011 | Gavrilos ................ | G06F 21/31 726/2 |
| 8,225,384 B2 * | 7/2012 | Pizano et al. ..................... | 726/7 |
| 8,365,267 B2 * | 1/2013 | Wang ..................... | G06F 21/31 707/694 |
| 8,539,247 B2 * | 9/2013 | McGrew ................. | G06F 21/46 713/182 |
| 8,555,357 B1 * | 10/2013 | Gauvin ............................ | 726/6 |

(Continued)

*Primary Examiner* — Eleni A Shiferaw
*Assistant Examiner* — Paul E Callahan
(74) *Attorney, Agent, or Firm* — Haynes and Boone, LLP (57) ABSTRACT

Systems, methods and devices for creating a user credential are provided. A device for creating a user credential for user authentication includes one or more processors configured to generate a first list of credential components from a second list of credential components and a network interface component coupled to a network. The network interface component is configured to transmit the generated first list of credential components to a user device, receive a user selection of at least one credential component from the transmitted first list of credential components, at least the user selection being selected by the user during user authentication, and receive a user entry. The device also includes a memory, the memory storing a combination of the user selection and the user entry as a created user credential. Systems, methods, and devices for authenticating a user with the created user credential are also provided.

27 Claims, 6 Drawing Sheets

(56) References Cited

U.S. PATENT DOCUMENTS

| | | | |
|---|---|---|---|
| 2005/0044425 A1* | 2/2005 | Hypponen | 713/202 |
| 2007/0150603 A1* | 6/2007 | Crull et al. | 709/227 |
| 2008/0177994 A1* | 7/2008 | Mayer | 713/2 |
| 2011/0022838 A1* | 1/2011 | Shaikh | H04L 63/0823 |
| | | | 713/156 |

* cited by examiner

SYSTEMS AND METHODS FOR CREATING A USER CREDENTIAL AND AUTHENTICATION USING THE CREATED USER CREDENTIAL

RELATED APPLICATIONS

This application claims priority to U.S. Provisional Application No. 61/552,297, filed Oct. 27, 2011, the entire contents of which are hereby incorporated by reference herein.

TECHNICAL FIELD

Embodiments disclosed herein are related to systems and methods for creating unique user credentials and authentication using the created user credential. In particular, systems and methods disclosed herein may provide a user with a list random selectable credential selection to be combined with a user entry to create a user credential that is unique but memorable to the user and authentication using the created user credential.

RELATED ART

Users often utilize the same credentials to login to many different web services. Credential reuse is a substantial threat to the security of web services and leaves users vulnerable, but is very common. For example, if a user uses the same credentials for online banking, an e-mail provider, and a payment service provider, all it takes is for an attacker to gain access to one of those providers, gain the user's credentials, and then the attacker will be successful if attempting to login to the other providers. Typical computer users reuse credentials because it is difficult for them to remember many credentials, and because they can. One way to make credential reuse less common would be to make additional credentials easier to remember. Another way is to make the act of reusing more complicated, unlikely to work, or to detect it when it occurs. In the past, some service providers have assigned credentials to users. While the goal might not have been to avoid reuse, this has been a side effect of assigning credentials. However, another side effect is that recall rates drastically suffer. It is difficult to remember a password that you did not come up with yourself. This disclosure describes a way to make reuse unlikely to work, while at the same time making credentials easier to recall. At a high level, a method discourages reuse of credentials by constraining the space of possible credentials for users. This makes it virtually impossible for users to reuse credentials that they have already established and used elsewhere, given that those credentials were not constrained, or were not constrained in the same manner.

Accordingly, there is a need for a system and method that creates a user credential that is both unique and random enough to prevent reuse but easy to remember and a further need to provide systems and methods that allow for user authentication with the created user credential.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Consistent with some embodiments, there is provided a device for creating a user credential for user authentication that includes one or more processors configured to generate a first list of credential components from a second list of credential components and a network interface component coupled to a network. The network interface component is configured to transmit the generated first list of credential components to a user device, receive a user selection of at least one credential component from the transmitted first list of credential components, at least the user selection being input by the user during user authentication, and receive a user entry. The device also includes a memory, the memory storing a combination of the user selection and the user entry as a created user credential.

Consistent with some embodiments, there is also provided a non-transitory computer-readable medium having instructions for execution by one or more processors that, when executed, cause the one or more processors to perform a method for creating a user credential for user authentication. The method includes generating a first list of credential components from a second list of credential components, transmitting the first list of credential components to a user, receiving a user selection of at least one credential component from the transmitted list of first credential components, at least the user selection being input by the user during user authentication, receiving a user entry, and storing a combination of the user selection and the user entry as the user credential.

Consistent with some embodiments, there is further provided a non-transitory computer-readable medium having instructions for execution by one or more processors that, when executed, cause the one or more processors to perform a method for authenticating a user. The method includes receiving a user credential, the user credential comprising a combination of a user-selected credential component and a user entry; and determining if the received user credential matches a stored user credential associated with the user.

These and other embodiments will be described in further detail below with respect to the following figures.

Figure 1:
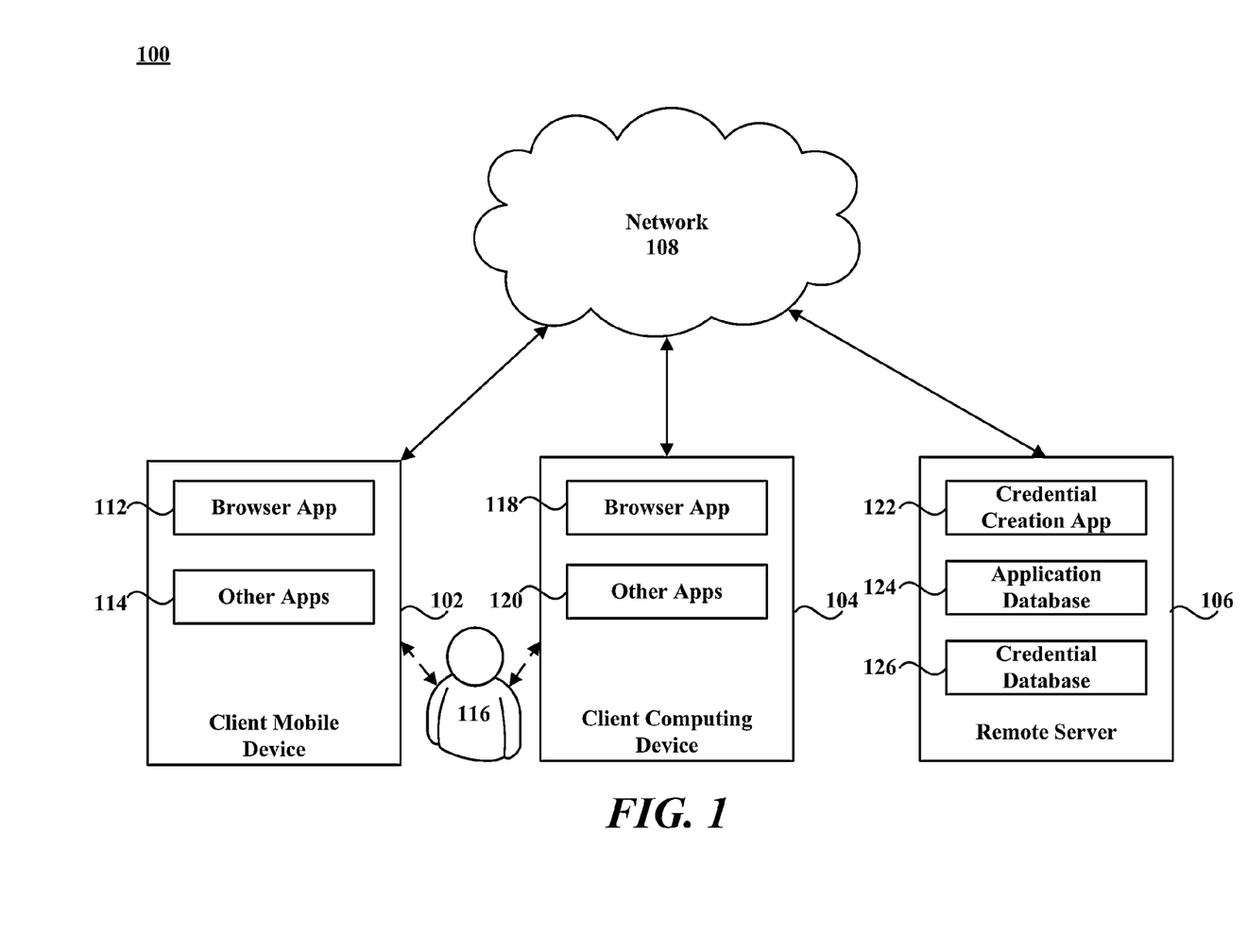
FIG. 1 is a block diagram of a networked system, consistent with some embodiments.

FIG. 1 is a block diagram of a networked system 100, consistent with some embodiments. System 100 includes a client mobile device 102, a client computing device 104, and a remote server 106 in communication over a network 108. Remote server 106 may be a payment service provider server that may be maintained by a payment provider, such as PayPal, Inc. of San Jose, Calif. Server 106 may be maintained by other service providers in different embodiments. Remote server 106 may also be maintained by an entity with which sensitive credentials and information may be exchanged with client mobile device 102 and client computing device 104. Remote server 106 may be more generally a web site, an online content manager, a service provider, such as a bank, or other entity who provides content to a user requiring user authentication or login.

Network 108, in one embodiment, may be implemented as a single network or a combination of multiple networks. For example, in various embodiments, network 108 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client mobile device 102, in one embodiment, may be implemented using any appropriate combination of hardware and/or software configured for wired and/or wireless communication over network 108. For example, client mobile device 102 may be implemented as a wireless telephone (e.g., smart phone), tablet, personal digital assistant (PDA), notebook computer, and/or various other generally known types of wired and/or wireless mobile computing devices. Consistent with some embodiments, client mobile device 102 may include any appropriate combination of hardware and/or software having one or more processors and capable of reading instructions stored on a non-transitory machine-readable medium for execution by the one or more processors. Consistent with some embodiments, client mobile device 102 includes a machine-readable medium, such as a memory (not shown) that includes instructions for execution by one or more processors (not shown) for causing client mobile device 102 to perform specific tasks. For example, such instructions may include displaying content, such as a web page or a user interface using a browser 112. Further, content may be content displayed by particular applications or "apps" 114 stored in a memory of client mobile device 102 and executed by one or more processors executing in client mobile device 102. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which one or more processors or computer is adapted to read.

Client mobile device 102 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™. Client mobile device 102 may also be a tablet computer, such as an iPad™ or other tablet computer running one of the aforementioned operating systems. It should be appreciated that, in various embodiments, client mobile device 102 may be referred to as a user device or a customer/client device without departing from the scope of the present disclosure.

Consistent with some embodiments, browser 112 may be a mobile browser app, which may be used to provide a user interface to permit a user 116 to browse information available over network 108. For example, browser application 112 may be implemented as a web browser to view information available over network 108. Browser application 112 may include a software program, such as a graphical user interface (GUI), executable by one or more processors that is configured to interface and communicate with the remote server 106 or other servers managed by content providers or merchants via network 108. For example, user 116 is able to access websites to find and purchase items through a payment service provider, such as PayPal, as well as access user account information or web content. User 116, through client mobile device 102, may also communicate with remote server 106 to create an account, create user credentials to be associated with the account, authenticate and/or log in to the account using the created user credentials, and make a payment to a merchant or another individual connected to network 108.

Client mobile device 102, in one embodiment, may include other applications 114 as may be desired in one or more embodiments to provide additional features available to user 116, including accessing a user account with remote server 106. For example, applications 114 may include interfaces and communication protocols that allow the user to receive and transmit information through network 108 and to remote server 106 and other online sites. Applications 114 may also include security applications for implementing client-side security features, programmatic client applications for interfacing with appropriate application programming interfaces (APIs) over network 108 or various other types of generally known programs and/or applications. Applications 114 may include mobile apps downloaded and resident on client mobile device 102 that enables user 116 to access content through the apps.

Client computing device 104, which can be similar to client mobile device 102, may be a separate device, such as a PC or laptop or netbook, or may be omitted if the user will be using only client mobile device 102. Both user devices may be used to access content with remote server 106 or other content provider. Client computing device 104, in one embodiment, may include a browser application 118 and other applications 120, similar to browser application 112 and applications 114 in client mobile device 102. Browser application 118 and applications 120 enable user 116 to access a payment provider web site and communicate with remote server 106, as well as other online sites.

Remote server 106 according to some embodiments, may be maintained by an online payment provider, which may provide processing for online financial and information transactions on behalf of user 116. Remote server 106 may include at least credential creation application 122, which may be adapted to interact with client mobile device 102 and/or client computing device 104 over network 108 to create credentials for user 116 to be associated with user 116. Remote server 106 may also include an application database 124 for storing various applications for interacting with client mobile device 102 and client computing device 104 over network 108 for purposes other than credential creation. Such applications may include applications for authentication, conducting financial transactions and shopping and purchasing items. Remote server 106 may also include a credential database 126 that may store selectable credential selections that may include words and images, for presentation to user 116 during the credential creation process. Credential database 126 may also store the created credentials for use in authenticating user 116 on subsequent login attempts.

Figure 2:
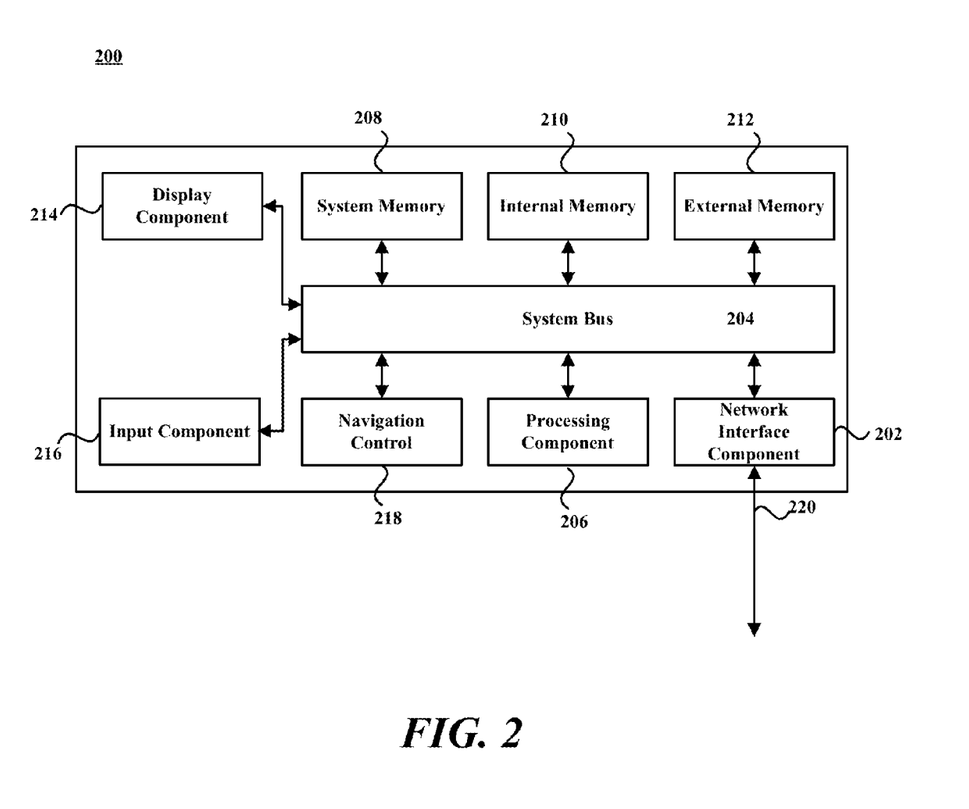
FIG. 2 is a diagram illustrating a computing system, consistent with some embodiments.

FIG. 2 is a diagram illustrating computing system 200, which may correspond to any of client mobile device 102, client computing device 104, or remote server 106, consistent with some embodiments. Computing system 200 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™, as would be consistent with client mobile device 102. Computing system 200 may also be a tablet computer such as the iPad™ or other similar device running the aforementioned operating systems. Computing system 200 may also be personal computer, laptop computer, netbook, or tablet computer as would be consistent with client computing device 104. Further, computing system 200 may also be a server or one server amongst a plurality of servers, as would be consistent with remote server 106. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 108. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Consistent with some embodiments, computing system 200 includes a system bus 204 for interconnecting various components within computing system 200 and communication information between the various components. Such components include a processing component 206, which may be one or more processors, micro-controllers, or digital signal processors (DSP), a system memory component 208, which may correspond to random access memory (RAM), an internal memory component 210, which may correspond to read-only memory (ROM), and a external or static memory 212, which may correspond to optical, magnetic, or solid-state memories. Consistent with some embodiments, computing system 200 further includes a display component 214 for displaying information to a user 116 of computing system 200. Display component 214 may be an liquid crystal display (LCD) screen, an organic light emitting diode (OLED) screen (including active matrix AMOLED screens), an LED screen, a plasma display, or a cathode ray tube (CRT) display. Computing system 200 may also include an input component 216, allowing for a user 116 of computing system 200 to input information to computing system 200. Such information could include payment information such as an amount required to complete a transaction, account information, authentication information, or identification information. An input component 216 may include, for example, a keyboard or key pad, whether physical or virtual. Computing system 200 may further include a navigation control component 218, configured to allow a user to navigate along display component 214. Consistent with some embodiments, navigation control component 218 may be a mouse, a trackball, or other such device. Moreover, if device 200 includes a touch screen, display component 214, input component 216, and navigation control 218 may be a single integrated component, such as a capacitive sensor-based touch screen.

Computing system 200 may perform specific operations by processing component 206 executing one or more sequences of instructions contained in system memory component 208, internal memory component 210, and/or external or static memory 212. In other embodiments, hard-wired circuitry may be used in place of or in combination with software instructions to implement the present disclosure. Logic may be encoded in a computer readable medium, which may refer to any medium that participates in providing instructions to processing component 206 for execution. Such a medium may take many forms, including but not limited to, non-volatile media, volatile media, and transmission media. The medium may correspond to any of system memory 208, internal memory 210 and/or external or static memory 212. Consistent with some embodiments, the computer readable medium is non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 220 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 220 and network interface component 202. Communication link 220 may be wireless through a wireless data protocol such as Wi-Fi™, 3G, 4G, HDSPA, LTE, RF, NFC, or through a wired connection. Network interface component 202 may include an antenna, either separate or integrated, to enable transmission and reception via communication link 220. Received program code may be executed by processing component 206 as received and/or stored in memory 208, 210, or 212.

Consistent with some embodiments, user 116 using computing system 200 that may correspond to either client mobile device 102 or client computing device 104 may wish to interact with remote server 106. In order to access services offered by remote server 106, user 116 may be required to enter a credential in order to be authenticated to remote server 106 and access services provided by remote server 106. As discussed above, credential reuse is problematic and should be prevented. One way of preventing credential reuse is for user 116 to be assigned a credential by remote server 106. A problem with this approach is that it may be difficult for user 116 to remember an assigned credential. As a result, most remote servers 106 that require user credentials allow a user to choose their own credential, which leads to credential reuse. In order to provide credentials that may be more easily remembered by user 116, while reducing credential reuse, remote server 106 may provide user 116 with a way to create a constrained credential that includes a constrained component and a user-chosen component. Moreover, a part of the credential is constrained in a way that may be randomized. Consider a credential that is made up of different components. A component may be a character, a small collection of characters, a word, or an image. At least one of these components is constrained, meaning that user 116 is not allowed to choose freely among all possible components. As a result, user 116 associated with the account cannot copy or reuse a credential from another remote server 106 and use it as the credential for the account on the current remote server 106 that user 116 is attempting to access. For example, if remote server 106 were to require that all credentials start with the letter "W", then credentials from other sites cannot be used unless they either already start with a W or user 116 adds a W. Another, more general policy would simply be that the credential must contain the letter W, but not necessarily start off with a W.

However, constraining the credential in a deterministic manner, as described above, makes it possible to reuse credentials that are created according to this rule. For example, if user 116 were to decide to start all his credentials on different remote server 106 with a W in order to conform to the rules at one remote server 106, and reuse the same credential everywhere, credential reuse has not been prevented. This may be overcome, however, by varying the constraints for different sessions or randomly selecting the constrained component on a session basis. For example, for one visit by user 116, the site may demand that the component "W" is used, whereas for another user, it may demand that the component "a" is used. It is also possible to let the position of the component be variable.

As noted above, it may be difficult for user 116 to remember a credential that they produce if the constrained components are not meaningful. Some users may be able to create memorable credentials from some constrained components but not from others. For example, user 116 may not be able to create a memorable credential incorporating the component "W", but might have recalled created credentials including either the components "a" or "72". Therefore, giving user 116 a collection of possible constrained choices allows user 116 to select one that they can relate to will help user 116 remember the entire credential. As an example, remote server 106 may offer a collection of components, such as "W", "a", "B", "88", and ask user 116 to first select one of these, and then construct a credential that contains it or otherwise conforms to the constraint. Similarly, the constraint may be the location, such as "place a digit in the first position", "place a digit in the second position", etc., alone or in combination with requiring user 116 to select from a collection of components. These constraints, again, may be randomly selected, as described above.

As another example, if user 116 who always selects credentials as names of friends and their associated birth dates, user 116 may choose the credential "JoeDec14", "Jim0318" or "MidsummerSue" when following this mental rule. However, when asked to use the component "W", user 116 may fail to come up with a suitable credential that they can later recall. It may be difficult for user 116 also if they are only provided with a small set of constraints to choose from. For example, being allowed to choose from the constraints "04", "45", "900" and "13" may not help user 116 who constructs credentials by incorporating birthdays. Therefore, while the goal of making the credential unique will be achieved, the resulting credential may not be memorable to user 116, and therefore difficult to remember. In order to overcome this problem, it is helpful to let at least some of the items in the collection of constraints have a meaning that is likely to be relevant to user 116; a typical example of such components are words. As an example, user 116 may be offered a collection of ten words, such as "fly", "big", "jump", "cold", "pig", "apple", "root", "stick", "glue", and "raw", asked to select one, and then to use the selected word as a component of the entire credential. For example, user 116 may select "fly" and then may construct the credential "flyTOmoon". As another example, user 116 may construct the credential "fly to moon" containing spaces or other delimiters.

Consistent with some embodiments, remote server 106 maintains a database of components, such as credential database 126, that have been determined to be suitable, and produces a selection from credential database 126. In some embodiments, the selection may be random. Remote server 106 would then communicate the selection of components to user 116, who would be requested to select one of the components and produce a credential based on the selected credential component. The components may be common words; however, words that are believed not to be memorable (such as the word "the") would not be part of the collection in the database. After user 116 has selected a component, user 116 may be asked to enter the "remainder" of the credential. For example, if the user selects "fly", he may enter the text "TOmoon", making the resulting credential "flyTOmoon". Other ways of assuring that the user follows the rule associated with the constraint are also possible; it is also possible not to enforce compliance, but simply hope that users recognize that they will benefit from following the guidelines. To log in, the user would have to enter the credential "flyTOmoon". An example of combined credential creation is shown in FIG. 3A.

Figure 3A:
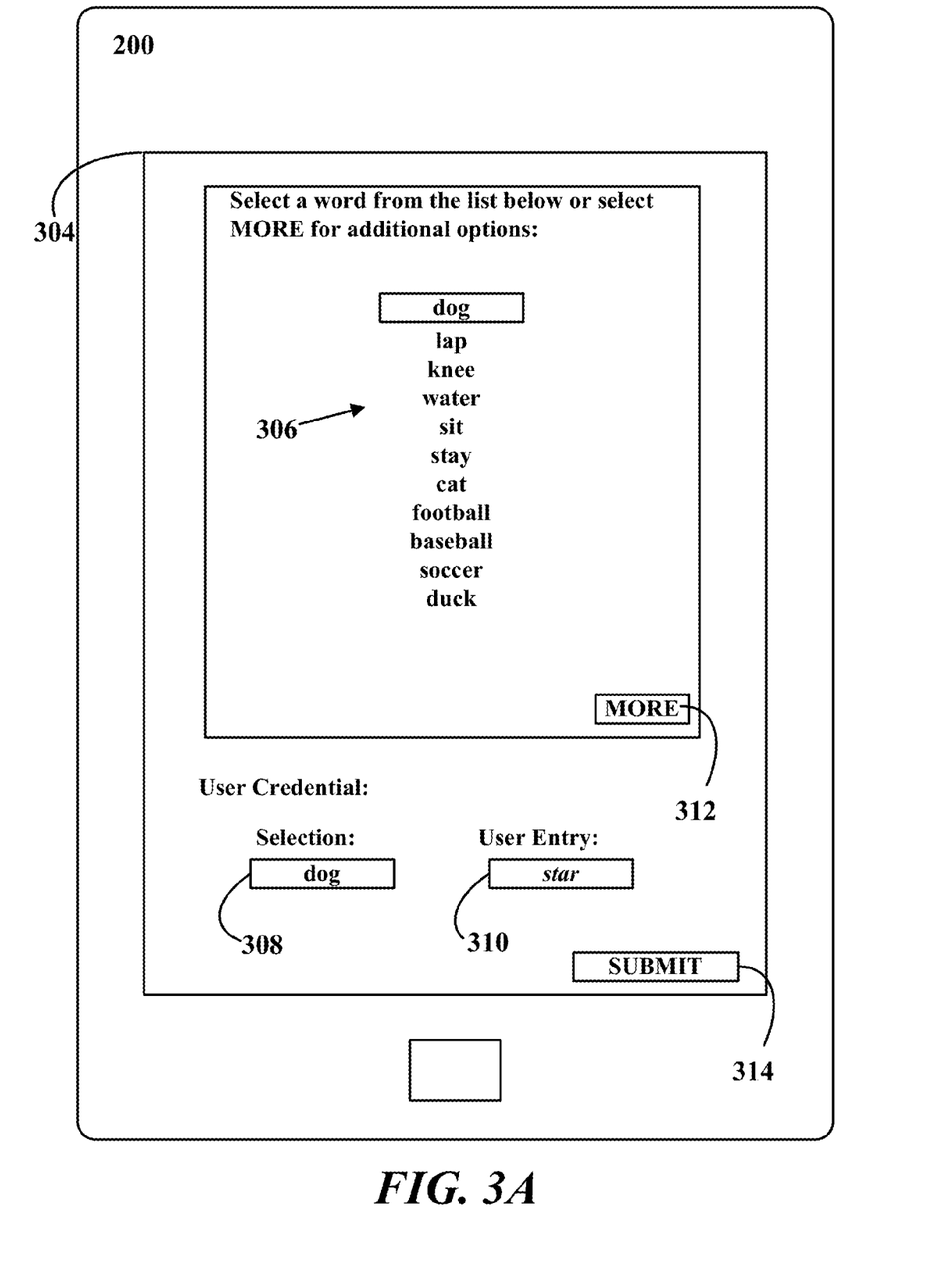
FIG. 3A illustrates a user interface showing a credential creation interface, consistent with some embodiments.

FIG. 3A illustrates a user interface showing a credential creation interface, consistent with some embodiments. As shown in FIG. 3A, computing system 200 includes a display 304 that presents a list 306 of selectable credential components for user 116 to select. The user-selected credential component 308, also referred to herein as user selection 308, will be combined with a user entry 310 to create a user credential. Consistent with some embodiments, list 306 is generated from a list of acceptable credentials stored in credential database 126. List 306 may also be randomly generated from the list of acceptable credentials stored in credential database 126. If user 116 reviews list 306 and decides that none of the components in list 306 are meaningful or easy to remember, user 116 may select a MORE button 312 wherein a new list 306 will be generated having at least some components that are different. User 116 may continue to select MORE button 312 until a satisfactory list 306 having a meaningful component is generated. After user selects a component from list 306, user then enters an entry 310 that may be text, a sound such as speech from user 116, or another component from list. For example, as shown in FIG. 3A, user 116 may select the word "dog" as user selection 308, and then may enter the word "star" as user entry 314. User 116 then selects a SUBMIT button 314 to transmit the selected combination to remote server 106 where it is checked to make certain that the combination adheres to certain credential rules and, if the combination credential adheres to these rules, it will be stored and associated with user 116. Consistent with some embodiments, the combination credential may be encrypted prior to storage. Such encryption may include salting and hashing the combination credential. Moreover, the credential rules may include making certain that user selection 308 does not match user entry 310 or making certain that user selection 308 does not match any other information associated with user 116, such as a user's birthday, name, security question answers, information available from the user's social media pages, on the user's personal webpage, or information generally associated with the user's email address (e.g., name of company user works for when using company e-mail address). Once the combined credential has been stored and associated with user 116, the next time that user 116 attempts to interact with remote server 106, user 116 will be prompted for the created credential.

Consistent with some embodiments, text- or word-based list 306 may be extended to require multiple lists of words, wherein user 116 selects one word from each list to create a sentence that is stored as a user credential. In such embodiments, user 116 may not be required to provide user entry 310. When logging in to remote server 106 using such a credential, user 116 may be presented with multiple lists that include the selected words and create the sentence or phrase that was saved as the credential. Because a would-be attacker would be required to select the right word from each list in the correct order, the chances that a script or brute force attempt would be able to produce the correct credential is minimal.

The constrained component may be a collection of images that are presented to user 116 after being selected in some manner from credential database 126. For example, remote server 106 may draw a collection of images using a round-robin or random method and presenting the selected collection of images to user 116. In one instance, user 116 may see an image of a dog, an image of a rat, an image of a cup of coffee, and an image of a skier. User 116 may select the skier as the selectable constraint, and asked to provide the remainder of the credential, which may be the words "loveTahoe". When user 116 wishes to log in, he would enter his user name, after which some set of images may be shown to him, where one is the image of the skier (or another skier, or another associated image); and where he has to select this image and enter "loveTahoe" in order to be authenticated.

Figure 3B:
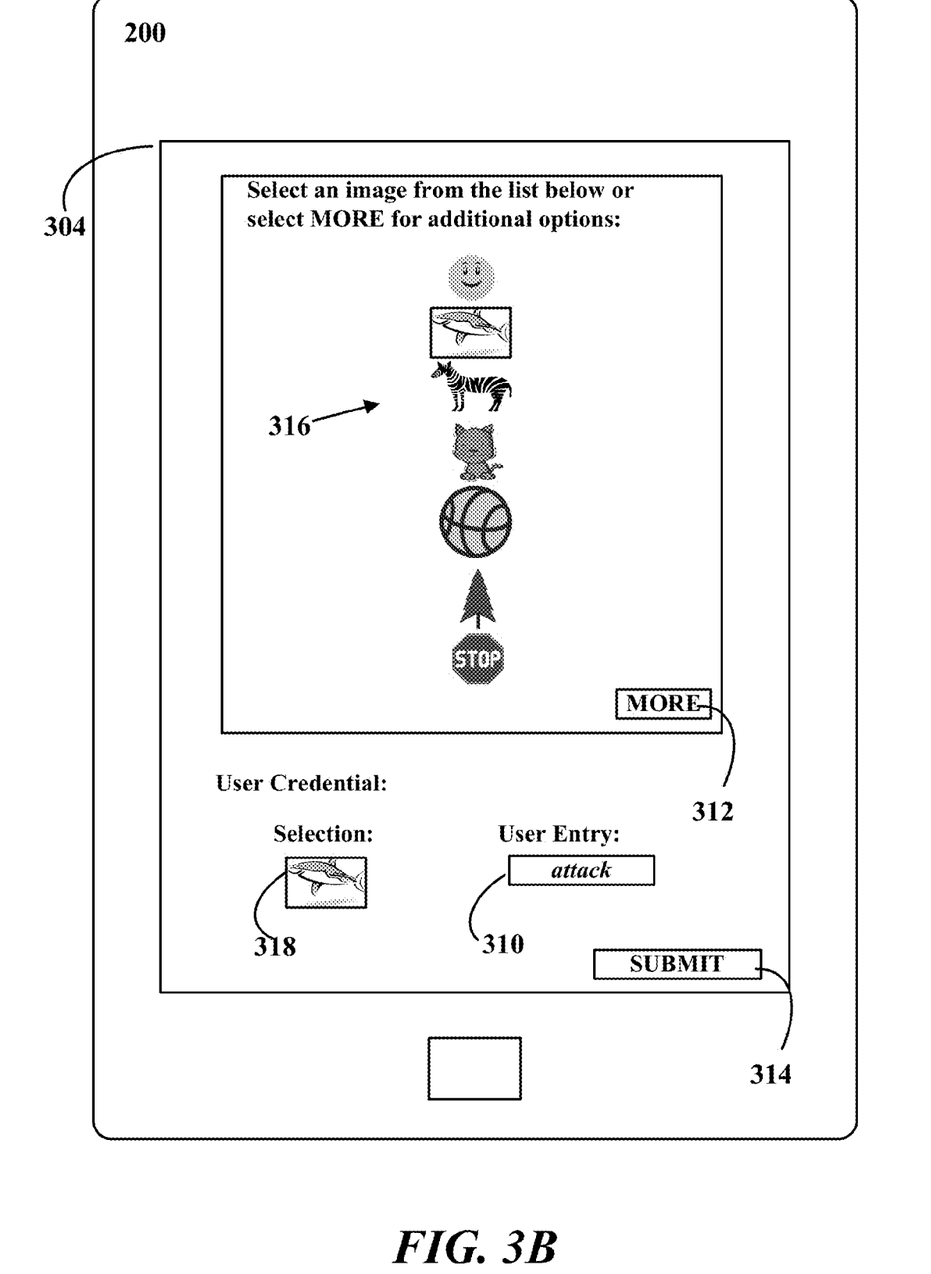
FIG. 3B illustrates a user interface showing a credential creation interface, consistent with some embodiments.

FIG. 3B illustrates a user interface showing a credential creation interface, consistent with some embodiments. As shown in FIG. 3B, computing system 200 includes a display 304 that presents a list 316 of credential components for user 116 to select. The user-selected credential component 318, also referred to herein as user selection 318, will be combined with a user entry 310 to create a user credential. Consistent with some embodiments, list 316 is generated from a list of acceptable credentials stored in credential database 126. List 306 may also be randomly generated from the list of acceptable credentials stored in credential database 126. If user 116 reviews list 316 and decides that none of the components in list 316 are meaningful or easy to remember, user 116 may select the MORE button 312 wherein a new list 316 will be generated having at least some components that are different. User 116 may continue to select MORE button 312 until a satisfactory list 316 having a meaningful component for selection is generated. After user 116 selects a component from list 316, user then enters an entry 310 that may be text, a sound such as speech from user 116, or another selection from list 316. For example, as shown in FIG. 3B, user 116 may select an image of a shark as user selection 318, and then may enter the word "attack" as user entry 314. User 116 then selects the SUBMIT button 314 to transmit the selected combination to remote server 106 where it is checked to make certain that the combination adheres to certain credential rules and, if the combination credential adheres to these rules, it will be stored and associated with user 116. Consistent with some embodiments, the combination credential may be encrypted prior to storage. Such encryption may include salting and hashing the combination credential. The credential rules may include making certain that user selection 318 does not match user entry 310 or making certain that user selection 318 does not match any other information associated with user 116, such as a user's birthday, name, security questions answer, etc. Once the combined credential has been stored and associated with user 116, the next time that user 116 attempts to interact with remote server 106, user 116 will be prompted for the created credential.

Consistent with some embodiments, once user 116 has created an acceptable credential that has been associated with user 116 and stored on remote server 106, user 116 will be able to login to remote server 106 using the created credential. The login process may be similar to the creation process in some embodiments. For example, if user 116 created a text or word-based credential, such as shown in FIG. 3A, user 116 may be presented with a list of words, similar to list 306, that includes user selection 308 amongst the words. User 116 would then select the word that matches user selection 308, enter user entry 310, and then select the submit button 314. The combination of user selection 308 or 318 and user entry 310 would be compared with the stored credential to determine if there is match. If there is a match, user 116 would be authenticated to remote server 106. If there is not a match, user 116 would not be authenticated and may be provided with additional information for completing the login. Such additional information may be a hint related to the credential, a security question, or remote server 106 may send an email to an email address associated with user 116. According to some embodiments, remote server 106 may compare the combination of user selection 308 and user entry 310 to determine if there is a partial match of at least one of user selection 308 or 318 and user entry 310 and, in some embodiments where lower security is acceptable, permit authentication based on a partial match.

The process would be similar for an image-based credential such as shown in FIG. 3B. User 116 may be presented with a list of images, similar to list 316, that includes user selection 318 amongst the images. User 116 would then select the image that matches user selection 318, enter user entry 310, and then select the submit button 314. The combination of selection 318 and user entry 310 would be compared with the stored credential to determine if there is match. If there is a match, user 116 would be authenticated to remote server 106. If there is not a match, user 116 would not be authenticated and may be provided with additional information for completing the login. Such additional information may be a hint related to the credential, a security question, or remote server 106 may send an email to an email address associated with user 116. In some embodiments, remote server 106 may use a simplified login, where user 116 only has to identify user selection 308 or 318 from a list such as list 306 or list 316, or user just enters the credential without having been presented list 306 or 316.

Figure 4:
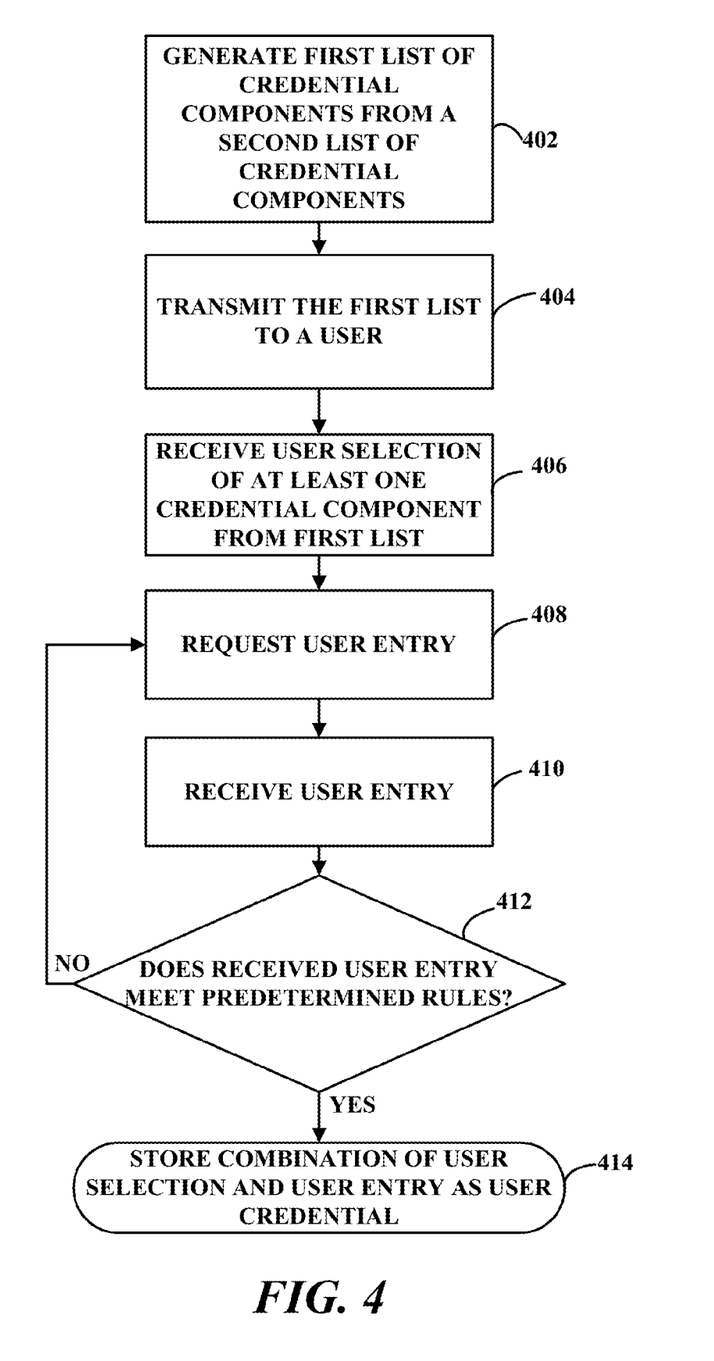
FIG. 4 is a flowchart illustrating a method for creating a user credential, consistent with some embodiments.

FIG. 4 is a flowchart illustrating a method for creating a user credential, consistent with some embodiments. For the purpose of illustration, FIG. 4 will be described with reference to FIGS. 1, 2, 3A, and 3B. The method shown in FIG. 4 may be embodied in computer-readable instructions for execution by one or more processors in processing component 206 such that the steps of the method may be performed by remote server 106. As shown in FIG. 4, the method begins when remote server 106 generates a first list of credential components from a second list of credential components (402). The generated first list may correspond to a text- or word-based list such as list 306 or an image list 316. Moreover, the second list may correspond to a list of credential components determined to be acceptable stored in credential database 126. According to some embodiments, the first list may be randomly generated. The generated first list 306 or 316 is then transmitted to user 116 (404). First list 306 or 316 may be transmitted over network 108 to client mobile device 102 or client computing device 104 and may be presented to user on display component 214. Consistent with some embodiments, client mobile device 102 or client computing device 104 may be executing instructions stored in memory for accessing remote server 106. Such instructions may be part of browser app 112 or 118 or other apps 114 or 120. Once the user selects a credential component from first list 306 or 316, remote server 106 receives the user selection 308 or 318 (406). User 116 is then required to provide a user entry 310 before proceeding (408) which will be received by remote server 106 when user 116 has entered user entry 310 and selected submit button 314 (410). User entry 310 received by remote server is then checked to make certain that it adheres to certain predetermined credential rules (412). The credential rules may include making certain that user selection 308 or 318 does not match user entry 310 or making certain that user selection 308 or 318 does not match any other information associated with user 116, such as a user's birthday, name, security questions answer, etc. If user entry 310 meets the predetermined credential rules, remote server will stored the combination of selected user selection 308 or 318 and user entry 310 as the user credential and associate the stored credential with user 116 (414). Remote server 106 may encrypt the combination of selected user selection 308 or 318 and user entry 310, for example, by hashing and salting the combination, prior to storing the combination. If user entry 310 does not meet the predetermined credential rules, remote server 106 will reject entry 310 and request a new user entry (408). Once the combined credential has been stored and associated with user 116, the next time that user 116 attempts to interact with remote server 106, user 116 will be prompted for the created credential.

Figure 5:
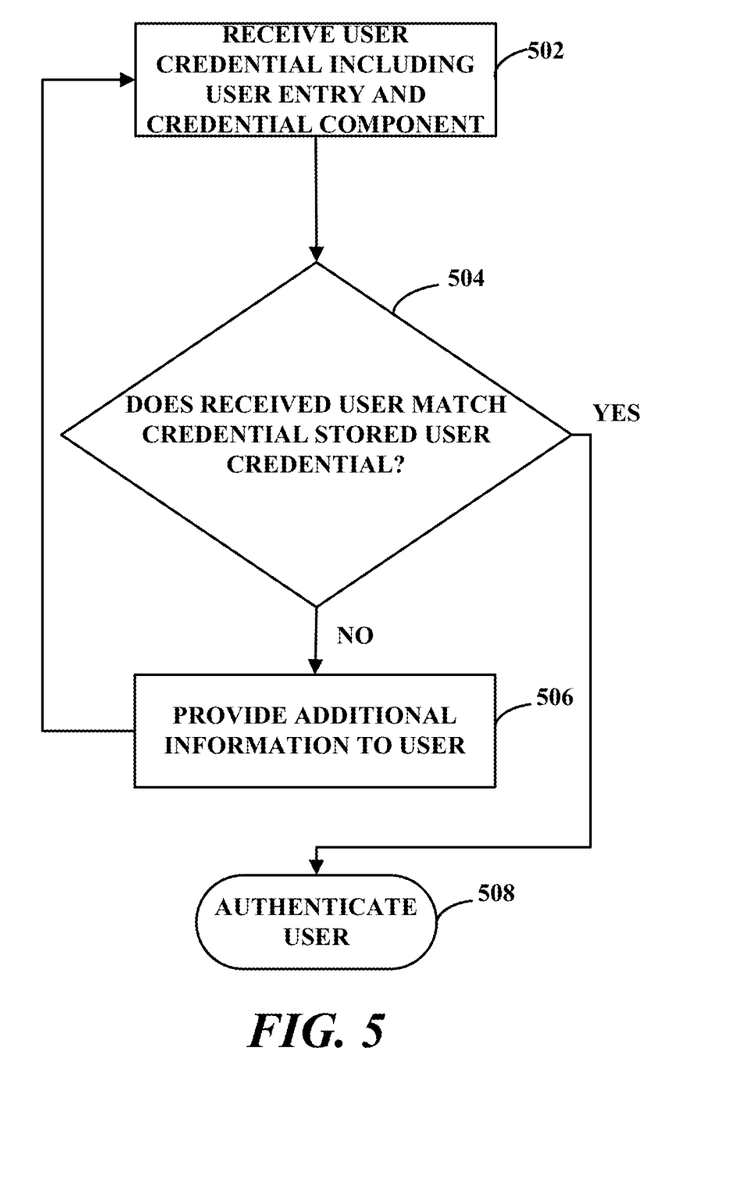
FIG. 5 is a flowchart illustrating a method for authenticating a user login with a created combination credential, consistent with some embodiments.

FIG. 5 is a flowchart illustrating a method for authenticating a user with a created combination credential, consistent with some embodiments. For the purpose of illustration, FIG. 5 will be described with reference to FIGS. 1, 2, 3A, and 3B. The method shown in FIG. 5 may be embodied in computer-readable instructions for execution by one or more processors in processing component 206 such that the steps of the method may be performed by remote server 106. As shown in FIG. 5, the method begins when remote server 106 receives a user credential including a user entry and a credential component from client mobile device 102 or client computer device 104 (502). Consistent with some embodiments, the credential component may have been entered by user 116, or may have been selected from a list transmitted to client mobile device 102 or client computing device 104 upon receiving a request for authentication. The transmitted list may correspond to a text- or word-based list such as list 306 or an image list 316, and will include user selection 308 or 318 selected by user 116 during the credential creation process. Consistent with some embodiments, client mobile device 102 or client computing device 104 may be executing instructions stored in memory for accessing remote server 106. Such instructions may be part of browser app 112 or 118 or other apps 114 or 120. Remote server 106 then determines if the received user credential matches a stored user credential associated with user 116 (504). If the received user credential matches the stored user credential associated with user 116, remote server 106 authenticates user 116 (508). According to some embodiments, remote server 106 may compare the combination of user selection 308 and user entry 310 to determine if there is a partial match of at least one of user selection 308 or 318 and user entry 310 and, in some embodiments where lower security is acceptable, permit authentication based on a partial match. If the received user credential does not match a stored user credential associated with user 116, remote server may provide additional information to user 116 (506). Such additional information may be a hint related to the credential, a security question, or remote server 106 may send an email to an email address associated with user 116. The authentication process then will restart when remote server receives a user credential (502).

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide methods, systems, and devices capable of decreasing the reuse of credentials by users and, thus, decreasing the chance that a user's credentials are obtained by an attacker. In particular, embodiments as described herein may provide require that a user choose a constrained credential component and combine that with a user entry component to create a combination credential that includes randomness, while being memorable to the user. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system comprising:
   a non-transitory memory;
   a network interface component; and
   one or more hardware processors coupled to the non-transitory memory and the network interface component, the one or more hardware processors being configured to execute instructions to cause the system to perform operations comprising:
      creating a new authentication credential of a user by:
         generating a first list of credential components from a second list of credential components;
         transmitting, using the network interface component, the first list of credential components to a user device;
         receiving, using the network interface component, a selection of a first credential component from the first list of credential components; and
         receiving, using the network interface component, a first user entry that is not a credential component selected from the first list of credential components;
         determining whether there is a match between the first credential component and the first user entry; and in response to the first credential component and the first user entry not matching, storing the first credential component and the first user entry as a new authentication credential for use in a later authentication attempt; and processing the later authentication attempt by the user after the creating of the new authentication credential by:

generating a third list of credential components from the second list of credential components;

transmitting, using the network interface component, the third list of credential components to the user;

receiving, using the network interface component, an attempted authentication credential from the user, the attempted authentication credential comprising a selection of a second credential component from the third list of credential components and a second user entry; and authenticating the user when the second credential component matches the stored first credential component and the second user entry matches the stored first user entry.

2. The system of claim 1, wherein the second list of credential components is stored in a credential database.

3. The system of claim 1, wherein the second list of credential components comprises a list of selectable words.

4. The system of claim 1, wherein the second list of credential components comprises a list of selectable images.

5. The system of claim 1, wherein the first user entry comprises a user text entry, a user voice recording, or a combination thereof.

6. The system of claim 1, wherein the new authentication credential can be used in existing authentication systems.

7. The system of claim 1, wherein the operations further comprise salting and hashing the new authentication credential before storing the new authentication credential.

8. The system of claim 1, wherein the operations further comprise storing the new authentication credential when the first credential component does not match an answer to a security question or an employer.

9. The system of claim 1, wherein the operations further comprise storing the new authentication credential when the first credential component does not match information available from a personal web page or a social media page of the user.

10. A non-transitory computer-readable medium having stored thereon machine-readable instructions executable to cause a machine to perform operations comprising:

creating a new authentication credential of a user by:

generating a first list of credential components from a second list of credential components;

transmitting the first list of credential components to a user;

receiving a selection of a first credential component from the first list of credential components;

receiving a first user entry that is not a credential component selected from the first list of credential components;

determining whether there is a match between the first credential component and the first user entry; and in response to the first credential component and the first user entry not matching, storing the first credential component and the first user entry as a new authentication credential for use in a later authentication attempt; and processing the later authentication attempt by the user after the creating of the new authentication credential by:

generating a third list of credential components from the second list of credential components;

transmitting the third list of credential components to the user;

receiving an attempted authentication credential component from the third list of credential components and a second user entry; and authenticating the user when the attempted authentication credential component matches the stored first credential component and the second user entry matches the stored first user entry.

11. The computer-readable medium of claim 10, wherein generating a first list of credential components comprises:
generating a list of selectable words.

12. The computer-readable medium of claim 10, wherein generating a first list of credential components comprises:
generating a list of selectable images.

13. The computer-readable medium of claim 10, wherein receiving the first user entry comprises:
receiving at least one of a user text entry, a user voice recording, or a combination thereof.

14. The computer-readable medium of claim 10, wherein the operations further comprise rejecting the new authentication credential when the first credential component and the first user entry match.

15. The computer-readable medium of claim 10, wherein the operations further comprise salting and hashing the new authentication credential before the new authentication credential is stored.

16. The computer-readable medium of claim 10, wherein the operations further comprise storing the new authentication credential when the first credential component does not match a birthday, an answer to a security question, or an employer.

17. The computer-readable medium of claim 10, wherein the operations further comprise storing the new authentication credential when the first credential component does not match information available from a personal web page or a social media page of the user.

18. A non-transitory computer-readable medium having stored thereon machine-readable instructions executable to cause a machine to perform operations comprising:

generating a first list of credential components from a second list of credential components;

transmitting the first list of credential components to a user device;

receiving an attempted authentication credential for a user, the attempted authentication credential comprising a first credential component selected from the first list of credential components and a first user entry that is not selected from the first list of credential components;

determining if the attempted authentication credential matches a previously stored authentication credential associated with the user, the previously stored authentication credential comprising a second credential component selected from the second list of credential components during creation of the previously stored authentication credential and a second user entry input by the user during the creation of the previously stored authentication credential and not selected from the second list of credential components, wherein the second credential component and the second user entry have previously been determined by the machine to not match; and authenticating the user when the first credential component matches the second credential component and the first user entry matches the second user entry.

19. The computer-readable medium of claim 18, wherein the first list of credential components comprises a list of selectable words or images.

20. The computer-readable medium of claim 18, wherein the first user entry comprises:

at least one of a user text entry, a user voice recording, or a combination thereof.

21. The computer-readable medium of claim 18, wherein determining if the attempted authentication credential matches the previously stored authentication credential associated with the user comprises determining if the attempted authentication credential matches the previously stored authentication credential within a predetermined tolerance.

22. The computer-readable medium of claim 18, wherein each credential component in the first list of credential components has a same shape, color, semantic meaning, or visual appearance to the second credential component.

23. The computer-readable medium of claim 18, wherein the operations further comprise:

providing additional information to the user if the attempted authentication credential does not match the previously stored authentication credential associated with the user.

24. The computer-readable medium of claim 23, wherein the additional information comprises a textual hint, a visual hint, a credential recovery option, or a combination thereof.

25. The computer-readable medium of claim 18, wherein determining if the attempted authentication credential matches the previously stored authentication credential comprises determining if the attempted authentication credential partially matches the previously stored authentication credential.

26. The computer-readable medium of claim 18, wherein the second credential component and the second user entry have been previously determined by the machine to not match a birthday, an answer to a security question, or an employer.

27. The computer-readable medium of claim 18, wherein the second credential component and the second user entry have been previously determined by the machine to not match information available from a personal web page or a social media page of the user.

* * * * *